United States Patent
Chen

(10) Patent No.: US 10,692,446 B2
(45) Date of Patent: *Jun. 23, 2020

(54) LIQUID CRYSTAL DISPLAY DEVICE

(71) Applicants: HKC Corporation Limited, Shenzhen (CN); Chongqing HKC Optoelectronics Technology Co., ltd., Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 43 days.

This patent is subject to a terminal disclaimer.

(21) Appl. No.: 16/087,507

(22) PCT Filed: Dec. 16, 2017

(86) PCT No.: PCT/CN2017/116717
§ 371 (c)(1),
(2) Date: Sep. 21, 2018

(87) PCT Pub. No.: WO2018/121304
PCT Pub. Date: Jul. 5, 2018

(65) Prior Publication Data
US 2019/0108801 A1    Apr. 11, 2019

(30) Foreign Application Priority Data

Dec. 27, 2016 (CN) .......................... 2016 1 1227794

(51) Int. Cl.
*G09G 3/36* (2006.01)
*G09G 3/34* (2006.01)
(Continued)

(52) U.S. Cl.
CPC ......... *G09G 3/3607* (2013.01); *G02F 1/1368* (2013.01); *G02F 1/13306* (2013.01);
(Continued)

(58) Field of Classification Search
CPC .. G09G 3/3614; G09G 3/3406; G09G 3/3426; G09G 3/367; G09G 3/3607;
(Continued)

(56) References Cited

U.S. PATENT DOCUMENTS

| 8,531,408 | B2 * | 9/2013 | Xu | ..................... G02F 1/134336 345/173 |
| 2010/0207862 | A1 * | 8/2010 | Xu | ..................... G02F 1/134336 345/90 |
| 2016/0351151 | A1 * | 12/2016 | Cao | ........................ H01L 27/124 |

* cited by examiner

*Primary Examiner* — Vijay Shankar
(74) *Attorney, Agent, or Firm* — WPAT, PC

(57) ABSTRACT

A liquid crystal display device includes a liquid crystal panel including a plurality of liquid crystal pixels, wherein the liquid crystal panel is configured to display a same picture in two adjacent frames; a driving module disposed on the non-display area, wherein the driving module is used to respectively provide each liquid crystal pixel with a same polarity pixel voltage of different levels in the two adjacent frames so as to deflect liquid crystal molecules of each liquid crystal pixel, and in each frame of the two adjacent frames, the level of the pixel voltage of each liquid crystal pixel is different from the level of the pixel voltage of the adjacent liquid crystal pixels in front, back, left or right.

20 Claims, 5 Drawing Sheets

(51) Int. Cl.
  *G02F 1/1337* (2006.01)
  *G02F 1/133* (2006.01)
  *G02F 1/13357* (2006.01)
  *G02F 1/1333* (2006.01)
  *G02F 1/1335* (2006.01)
  *G02F 1/1368* (2006.01)
  *G02F 1/1362* (2006.01)

(52) U.S. Cl.
  CPC .. *G02F 1/133308* (2013.01); *G02F 1/133514* (2013.01); *G02F 1/133611* (2013.01); *G02F 1/133753* (2013.01); *G09G 3/3406* (2013.01); *G09G 3/3426* (2013.01); *G09G 3/367* (2013.01); *G09G 3/3611* (2013.01); *G09G 3/3614* (2013.01); *G09G 3/3648* (2013.01); *G09G 3/3666* (2013.01); *G09G 3/3677* (2013.01); *G02F 1/1362* (2013.01); *G02F 2001/133601* (2013.01); *G02F 2201/52* (2013.01); *G09G 2310/0254* (2013.01); *G09G 2320/0233* (2013.01); *G09G 2320/0242* (2013.01); *G09G 2320/0247* (2013.01); *G09G 2320/062* (2013.01); *G09G 2320/0626* (2013.01); *G09G 2320/0666* (2013.01); *G09G 2320/0686* (2013.01); *G09G 2340/16* (2013.01)

(58) Field of Classification Search
  CPC .. G09G 3/3611; G09G 3/3648; G09G 3/3666; G09G 3/3677; G09G 2310/0254; G09G 2320/0247; G09G 2320/0626; G09G 2320/0233; G09G 2320/0666; G09G 2320/0686; G09G 2320/062; G09G 2320/0242; G09G 2340/16
  See application file for complete search history.

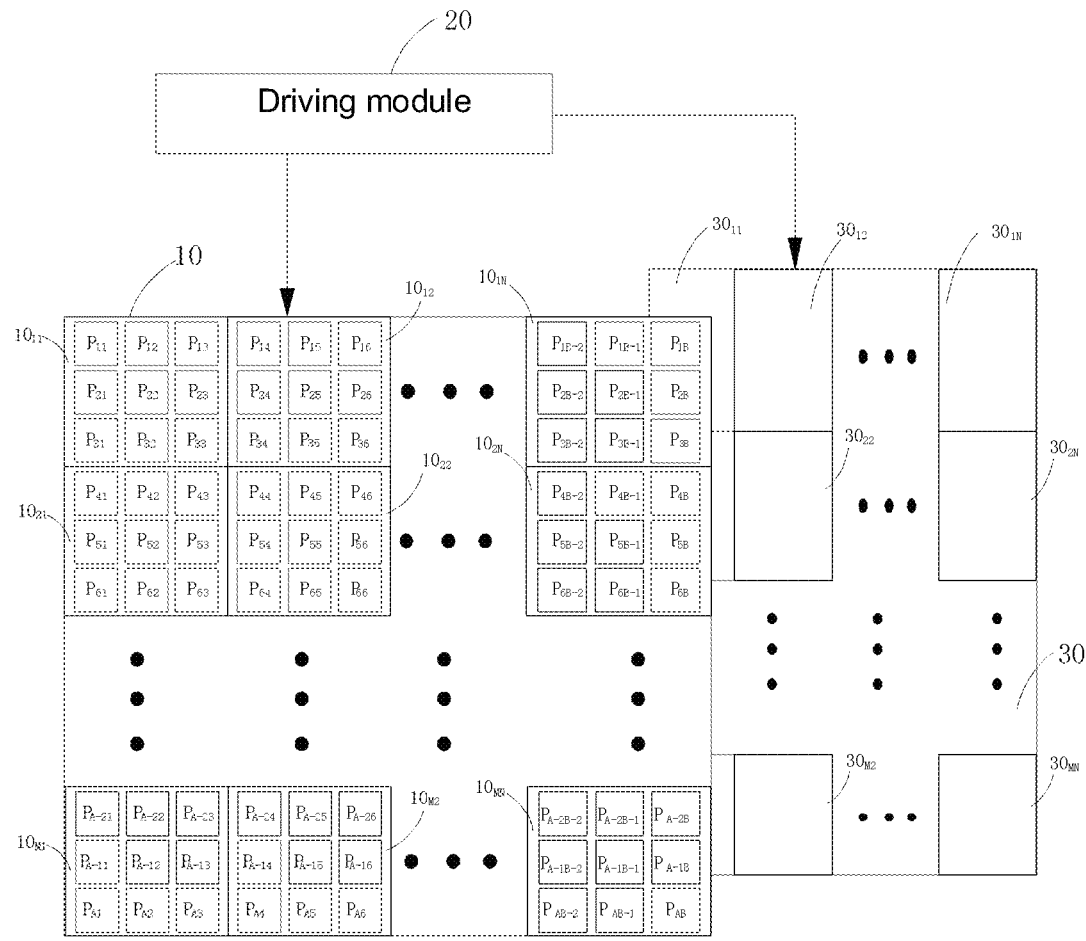

FIG. 4

| In the previous frame of the two adjacent frames, the driving module 20 provides each liquid crystal pixel of the liquid crystal panel 10 with the pixel voltage so as to deflect liquid crystal molecules of each liquid crystal pixel | S310 |

| In the latter frame of the two adjacent frames, the driving module 20 provides each liquid crystal pixel of the liquid crystal panel 10 with the pixel voltage so as to deflect liquid crystal molecules of each liquid crystal pixel. | S320 |

FIG. 5

LIQUID CRYSTAL DISPLAY DEVICE

FIELD OF THE DISCLOSURE

The disclosure relates to the field of liquid crystal display technologies, and more particularly to a liquid crystal display device.

BACKGROUND

With the evolution of optoelectronics and semiconductor technology, flat panel displays have also evolved. In many flat panel displays, liquid crystal displays have been applied to all aspects of production and life because of their advantages of high space utilization efficiency, low power consumption, no radiation and low electromagnetic interference.

The liquid crystal display generally includes a liquid crystal panel, a backlight module, and a driving module use for driving the liquid crystal panel and the backlight module. The liquid crystal panel includes a color filter substrate, an array substrate and a liquid crystal. The liquid crystal is sandwiched between the color filter substrate and array substrate. In a large-size liquid crystal panel, a negative-type VA (Vertically Aligned) liquid crystal is often used. However, the negative type VA liquid crystal has many defects. Especially when a large viewing angle is needed, the liquid crystal panel adopting the negative type VA liquid crystal will appear color shift phenomenon when viewed from a large viewing angle.

In order to solve the above defects, sub-pixels are often sub-divided into Main/Sub sub-pixels in the liquid crystal panel adopting the negative VA liquid crystal, and different pixel voltages are provided to Main/Sub sub-pixels. However, such pixel design often requires addition of metal wires and thin film transistors to drive the Main/Sub sub-pixels, resulting in the sacrifice of the aperture ratio and reducing light transmittance of the liquid crystal panel. In order to maintain the enough light transmittance, the luminance of the light emitted by the backlight module needs to be improved. Consequently, cost of the backlight module would be directly increased.

SUMMARY

On such basis, it is necessary to provide a liquid crystal display device which can improve color shifts without affecting the aperture ratio.

A liquid crystal display device includes a liquid crystal panel, including a plurality of liquid crystal pixels, wherein the liquid crystal panel is configured to display a same picture in two adjacent frames, the liquid crystal panel further includes a display area and a non-display area surrounding the display area, and the display area is provided with a transistor array substrate; a driving module disposed on the non-display area, wherein the driving module is used to respectively provide each liquid crystal pixel with a same polarity pixel voltage of different levels in the two adjacent frames so as to deflect liquid crystal molecules of each liquid crystal pixel, and in each frame of the two adjacent frames, the level of the pixel voltage of each liquid crystal pixel is different from the level of the pixel voltage of the adjacent liquid crystal pixels in front, back, left or right; wherein the non-display area is provided with a source control chip and a gate control chip, the source control chip is electrically connected to source electrodes of the transistors in the transistor array substrate through data lines, the gate control chip is electrically connected with gate electrodes of the transistors through scan lines, and the source control chip and the gate control chip are located at a same side of the display area.

In one embodiment, the liquid crystal display device further includes a backlight module, the liquid crystal panel is divided into M×N rectangular panel partitions, the backlight module is divided into M×N rectangular backlight partitions, 1≤i≤M, 1≤j≤N, the rectangular panel partition of row i and column j corresponds to the rectangular backlight partition of row i and column j; in each frame of two adjacent frames, after the liquid crystal molecules of each liquid crystal pixel in each rectangular panel partition are deflected, the driving module is further configured to drive all the rectangular backlight partitions to emit light simultaneously.

In one embodiment, the liquid crystal display device further includes backlight module, the liquid crystal panel is divided into M×N rectangular panel partitions, the backlight module is divided into M×N rectangular backlight partitions, 1≤i≤M, 1≤j≤N, the rectangular panel partition of the i-th row and the j-th column corresponds to the rectangular backlight partition of the i-th row and the j-th column; in each frame of two adjacent frames, after the liquid crystal molecules of each liquid crystal pixel in the rectangular panel partition of the i-th row and the j-th column are deflected, the driving module is further configured to drive the rectangle backlight partition of the i-th row and the j-th column to emit light, till all the rectangular backlight partition are driven to emit light.

In one embodiment, sum of the pixel voltages of all the liquid crystal pixels in the rectangular panel partition of the i-th row and the j-th column and luminance of the rectangular backlight partition in the jth column of the i-th row satisfy the following formula 1.

$$Lij\_1 * Vij\_1 = Lij\_2 * Vij\_2 \qquad \text{[formula 1]}$$

Wherein Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames.

In one embodiment, the sum of the pixel voltages of all the liquid crystal pixels in the rectangular panel partition of the i-th row and the j-th column and luminance of the rectangular backlight partition in the jth column of the i-th row satisfy the following formula 1.

$$Lij\_1 * Vij\_1 = Lij\_2 * Vij\_2 \qquad \text{[formula 1]}$$

Wherein Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames.

In one embodiment, the sum of the pixel voltages of all the liquid crystal pixels in the rectangular panel partition of the i-th row and the j-th column and luminance of the rectangular backlight partition in the jth column of the i-th row satisfy the following formula 2.

$$Lij\_1*Vij\_1+Lij\_2*Vij\_2=2*Lij*Vij \qquad \text{[formula 2]}$$

Wherein Lij represents the luminance of the rectangular backlight partition of the ith row and the jth column when the liquid crystal display is set to display the picture in only one frame, Vij represents the sum of the pixel voltages of all the liquid crystal pixels in the rectangular panel partition when the liquid crystal display is set to display the picture in only one frame, Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames.

In one embodiment, the sum of the pixel voltages of all the liquid crystal pixels in the rectangular panel partition of the i-th row and the j-th column and luminance of the rectangular backlight partition in the jth column of the i-th row satisfy the following formula 2.

$$Lij\_1*Vij\_1+Lij\_2*Vij\_2=2*Lij*Vij \qquad \text{[formula 2]}$$

Wherein Lij represents the luminance of the rectangular backlight partition of the ith row and the jth column when the liquid crystal display is set to display the picture in only one frame, Vij represents the sum of the pixel voltages of all the liquid crystal pixels in the rectangular panel partition when the liquid crystal display is set to display the picture in only one frame, Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames.

In one embodiment, the sum of the pixel voltages of all the liquid crystal pixels in the rectangular panel partition of the i-th row and the j-th column and luminance of the rectangular backlight partition in the jth column of the i-th row satisfy the following formula 2.

$$Lij\_1*Vij\_1+Lij\_2*Vij\_2=2*Lij*Vij \qquad \text{[formula 2]}$$

Wherein Lij represents the luminance of the rectangular backlight partition of the ith row and the jth column when the liquid crystal display is set to display the picture in only one frame, Vij represents the sum of the pixel voltages of all the liquid crystal pixels in the rectangular panel partition when the liquid crystal display is set to display the picture in only one frame.

In one embodiment, a number of lateral transistors in each row on the transistor array substrate is greater than that of vertical transistors in each column, and the source control chip and the gate control chip are located at a lateral side of the display area.

In one embodiment, thin film transistors in the transistor array substrate are single gate transistors, the gate control chip and the source control chip are sequentially arranged along a lateral side of the display area.

In one embodiment, the source control chip and the gate control chip are both fixed on a flexible circuit board by chip on film package.

In one embodiment, the source control chip and the gate control chip are both fixed on a flexible circuit board by tape carrier package.

In one embodiment, the liquid crystal panel is a liquid crystal panel with a vertically aligned display mode.

In one embodiment, the liquid crystal panel includes the transistor array substrate, a color filter substrate and negative liquid crystal, the negative liquid crystal is sandwiched between the color filter substrate and the array substrate.

In one embodiment, the liquid crystal panel and the backlight module are arranged facing each other, and the liquid crystal panel and the backlight module are combined and fixed by a frame.

In one embodiment, the liquid crystal pixel includes at least one red liquid crystal pixel, at least one green liquid crystal pixel or at least one blue liquid crystal pixel, in the column direction, the liquid crystal pixels are the same color liquid crystal pixels, and in the row direction, the liquid crystal pixels are arranged sequentially with groups of the red liquid crystal pixel, the green liquid crystal pixel and the blue liquid crystal pixel.

A liquid crystal display device includes a liquid crystal panel, including a plurality of liquid crystal pixels, wherein the liquid crystal panel is configured to display a same picture in two adjacent frames, the liquid crystal panel further includes a display area and a non-display area surrounding the display area, the display area is provided with a transistor array substrate, the liquid crystal panel is a liquid crystal panel with a vertically aligned display mode, and the liquid crystal pixel includes at least one red liquid crystal pixel, at least one green liquid crystal pixel or at least one blue liquid crystal pixel; a driving module disposed on the non-display area, wherein the driving module is used to respectively provide each liquid crystal pixel with a same polarity pixel voltage of different levels in the two adjacent frames so as to deflect liquid crystal molecules of each liquid crystal pixel, and in each frame of the two adjacent frames, the level of the pixel voltage of each liquid crystal pixel is different from the level of the pixel voltage of the adjacent liquid crystal pixels in front, back, left or right; wherein the non-display area is provided with a source control chip and a gate control chip, the source control chip is electrically connected to source electrodes of the transistors in the transistor array substrate through data lines, the gate control chip is electrically connected with gate electrodes of the transistors through scan lines, and the source control chip and the gate control chip are located at a same side of the display area.

In one embodiment, the pixel voltage of the liquid crystal pixel is proportional to the light transmittance of the liquid crystal pixel, a product of the light transmittance of the liquid crystal pixel and luminance of backlight is display brightness of the liquid crystal pixel.

In one embodiment, sum of the brightness of a same picture displayed in two adjacent frames of each rectangular panel partition of the liquid crystal panel is twice the brightness of the picture displayed in one frame of the liquid crystal panel without compensating for low color shift of viewing angle.

In one embodiment, the liquid crystal panel includes the transistor array substrate, a color filter substrate and negative liquid crystal, the negative liquid crystal is sandwiched between the color filter substrate and the array substrate.

In the above display device, each liquid crystal pixel is provided with a same polarity pixel voltage of different levels in the two adjacent frames, and in each frame of the two adjacent frames, the level of the pixel voltage of each liquid crystal pixel is different from the level of the pixel voltage of the adjacent liquid crystal pixels in front, back, left or right. So that at the same time of displaying the same picture in two adjacent frames, the liquid crystal panel 10 can also achieve the effect of compensating for low color shift of viewing angle, and that is, the color shift phenomenon does not occur when the liquid crystal panel 10 is viewed from the large viewing angle. The liquid crystal pixel can not be used as a main/sub sub-pixel, it is not necessary to add the metal wiring and the thin film transistor to drive the main/sub sub-pixel, so that the aperture ratio would not be reduced. The product of the luminance of the rectangular backlight partition and the sum of the pixel voltages of all the liquid crystal pixels in the rectangular panel partition is equal, so that the display brightness of the rectangular panel partition in the previous frame and the latter frame of the two adjacent frames is the same, and thus the flickering phenomenon can be eliminated. The sum of the brightness of a same picture displayed in two adjacent frames of each rectangular panel partition of the liquid crystal panel can be twice the brightness of the picture displayed in one frame of the liquid crystal panel without compensating for low color shift of viewing angle, so that the brightness of the picture displayed by the liquid crystal panel can be the same as the brightness of the picture displayed by the liquid crystal panel without the compensation effect of low color shift of viewing angle.

BRIEF DESCRIPTION OF THE DRAWINGS

Accompanying drawings illustrated here are used for providing further understanding on the present disclosure, and form part of the present disclosure, and schematic embodiments and illustration thereof of the present disclosure are used for explaining the present application rather than improperly limiting the present disclosure.

FIG. 4 is a schematic view of a liquid crystal display device in another embodiment according the present disclosure.

FIG. 5 is a flowchart of a method of driving the liquid crystal display device of FIG. 1.

DETAILED DESCRIPTION OF PREFERRED EMBODIMENTS

In order to explain the objects, technical solutions and advantages of the disclosure more clearly, the disclosure is further explained in detail in combination with drawings and embodiments. It should be understood that the specific embodiments described here are merely intended for explaining rather than limiting the disclosure.

Figure 1:
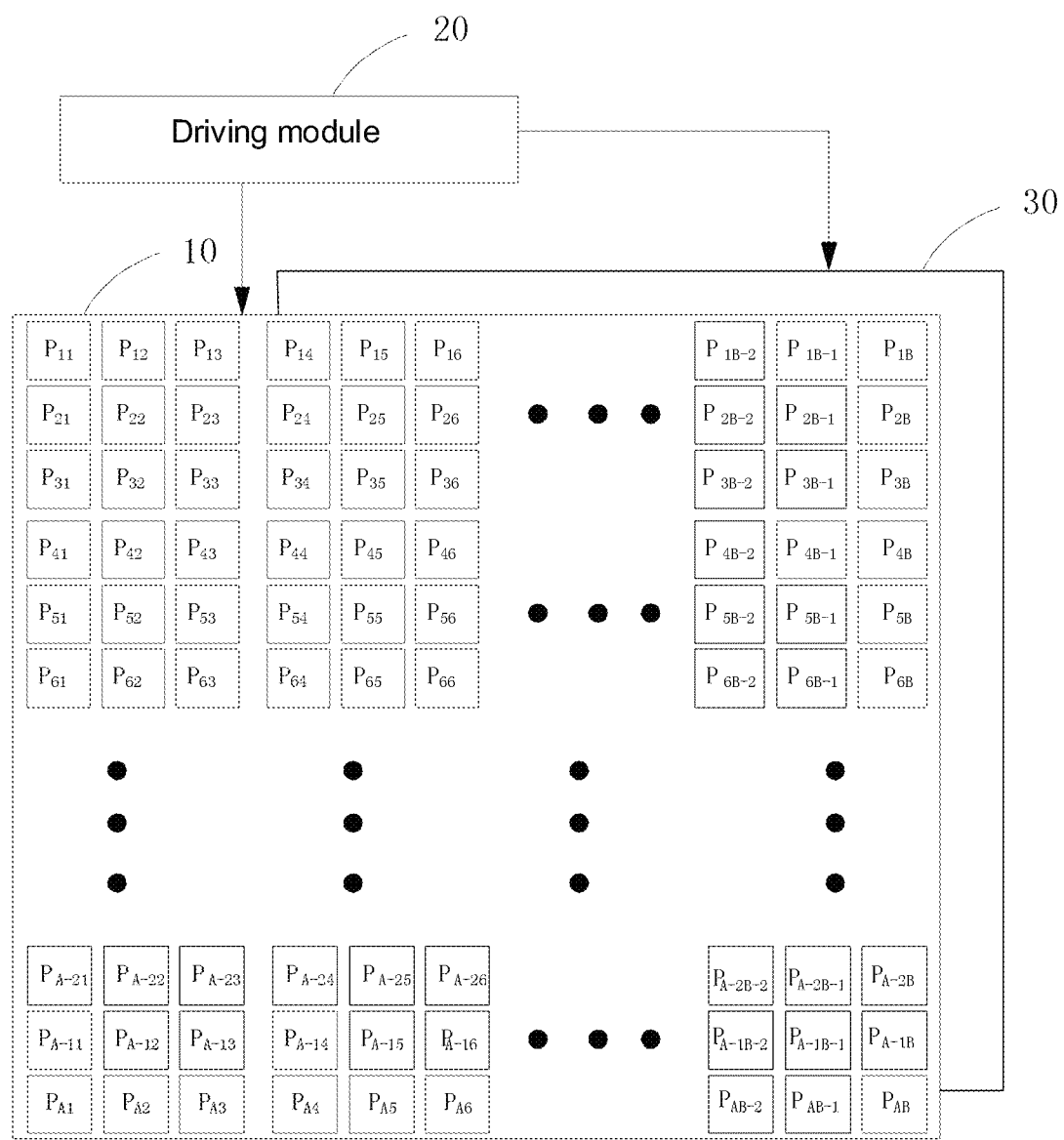
FIG. 1 is a schematic view of a liquid crystal display device in an embodiment according the present disclosure.

FIG. 1 is a schematic view of a liquid crystal display device in an embodiment according the present disclosure.

Referring to FIG. 1, the liquid crystal display device in an embodiment according the present disclosure includes a liquid crystal panel 10, a driving module 20 and a backlight module 30.

The liquid crystal panel 10 includes a transistor array substrate, a color filter substrate and negative liquid crystal, the negative liquid crystal is sandwiched between the color filter substrate and the array substrate. In other words, the liquid crystal panel 10 can be a liquid crystal panel with a vertically aligned display mode. In addition, the transistor array substrate can be a thin film transistor array substrate.

In the process of assembling the liquid crystal display, the liquid crystal panel 10 and the backlight module 30 are arranged facing each other, and then are fixed together by a fixing structure such as a frame. The driving module 20 drives the backlight module 30 to emit light for providing to the liquid crystal panel 10. In FIG. 1, the assembled state of the liquid crystal panel 10 and the backlight module 30 is not shown for convenience of description of the embodiment.

The liquid crystal panel 10 includes A×B liquid crystal pixels (i.e., subpixels) $P_{11}, P_{12}, \ldots, P_{AB}$. The liquid crystal pixel $P_{ab}$ (wherein, $1 \leq a \leq A$, $1 \leq b \leq B$, and both a and b are integers) may be a red liquid crystal pixel, a green liquid crystal pixel, or a blue liquid crystal pixel. There are at least one red liquid crystal pixel, at least green liquid crystal pixel, and at least one blue liquid crystal pixel in the liquid crystal pixels $P_{11}, P_{12}, \ldots, P_{AB}$. As a preferred embodiment, in the column direction, the liquid crystal pixels are the same color liquid crystal pixels, and in the row direction, the liquid crystal pixels are arranged sequentially with groups of the red liquid crystal pixel, the green liquid crystal pixel and the blue liquid crystal pixel.

In the liquid crystal panel 10 of this embodiment, each liquid crystal pixel is no longer subdivided into Main/Sub sub-pixels. In order to avoid color shift viewed the liquid crystal panel 10 from a large viewing angle, the present embodiment adopts the technical solutions as follows. The liquid crystal panel 10 is configured to display a same picture in two adjacent frames, and the driving module is used to respectively provide each liquid crystal pixel with a same polarity pixel voltage of different levels in the two adjacent frames so as to deflect liquid crystal molecules of each liquid crystal pixel, and in each frame of the two adjacent frames, the level of the pixel voltage of each liquid crystal pixel is different from the level of the pixel voltage of the adjacent liquid crystal pixels in front, back, left or right.

That is, the frame refresh rate of the liquid crystal panel 10 can be doubled. For example, the frame refresh rate of the liquid crystal panel 10 can be 120 HZ. For a specific method for improving the frame refresh rate, reference may be made to the related art, and details are not described herein.

The technical solution adopted in the above embodiment will be further elaborated below.

Referring to FIG. 1, in the previous frame of two adjacent frames, the driving module 20 provides a high pixel voltage (or a low pixel voltage) to the liquid crystal pixel $P_{ab}$ to deflect the liquid crystal molecules of the liquid crystal pixel $P_{ab}$. The driving module 20 provides a low pixel voltage (or a high pixel voltage) to drives the liquid crystal pixel $P_{(a-1)b}$, the liquid crystal pixel $P_{a(b-1)}$, the liquid crystal pixel $P_{a(b+1)}$, and the liquid crystal pixel $P_{(a+1)b}$.

In the latter frame of two adjacent frames, the driving module 20 provides a low pixel voltage (or a high pixel voltage) to the liquid crystal pixel $P_{ab}$ to deflect the liquid crystal molecules of the liquid crystal pixel $P_{ab}$. The driving module 20 provides a high pixel voltage (or a low pixel voltage) to drives the liquid crystal pixel $P_{(a-1)b}$, the liquid crystal pixel $P_{a(b-1)}$, the liquid crystal pixel $P_{a(b+1)}$, and the liquid crystal pixel $P_{(a+1)b}$.

That is the level of the pixel voltage of each liquid crystal pixel is different from the level of the pixel voltage of the adjacent liquid crystal pixels in front, back, left or right. And each of the liquid crystal pixels is provided with different levels of the pixel voltages in the two adjacent front and back frames. It should be noted that, the polarities of the high pixel voltage and the low pixel voltage are the same. In this way, the liquid crystal panel 10 can display the same picture in two adjacent frames.

In addition, the high pixel voltage and the low pixel voltage are determined in advance according to the input RGB signals and compensating for the required viewing angle effect, and are usually recorded in the driving module 10 by a look-up table (LUT). For example, taking an 8 bit driving signal as an example, each of the input RGB signals corresponds to 256 pairs of high and low pixel voltages, so there are 3*256 high pixel voltages and 3*256 low pixel voltages.

Figure 2:
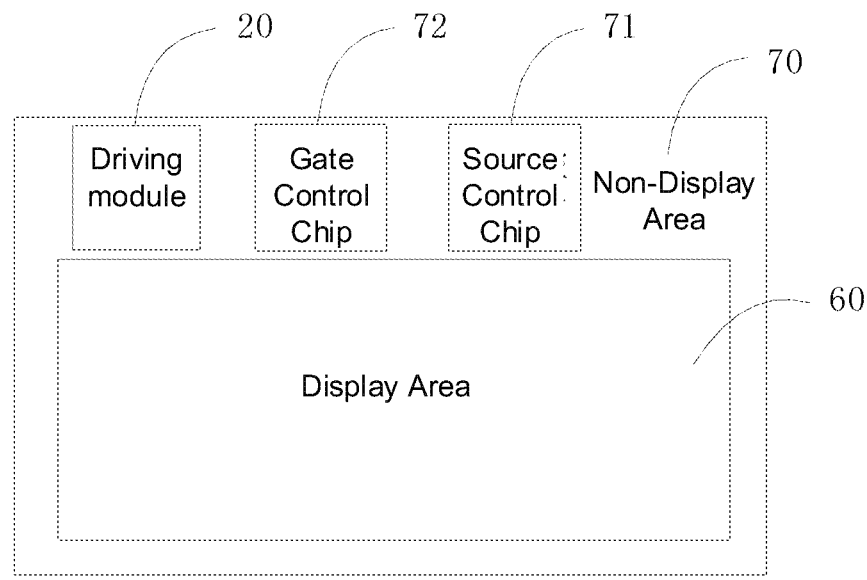
FIG. 2 is another schematic view of a liquid crystal display device in an embodiment according the present disclosure.
Figure 3:
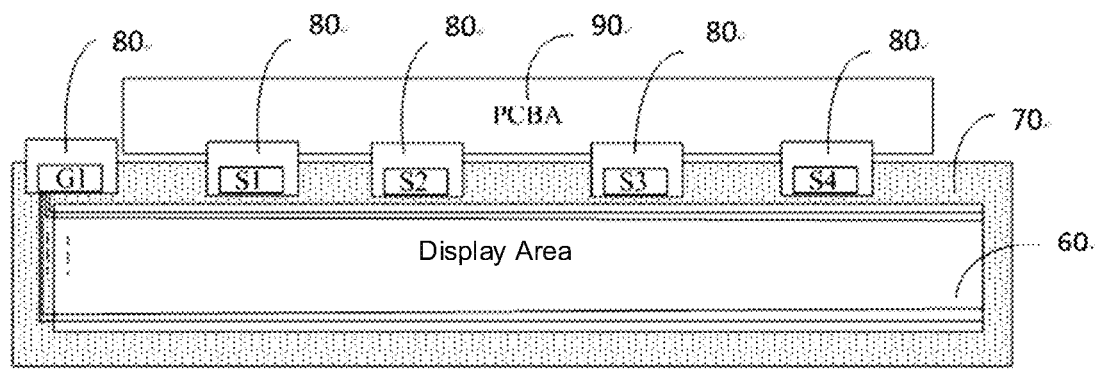
FIG. 3 is another schematic view of a liquid crystal display device in an embodiment according the present disclosure.

Further, referring to FIG. 2 and FIG. 3, the embodiment further provides a control circuit structure of the liquid crystal panel 10. The liquid crystal panel 10 further includes a display area 60 and a non-display area 70 surrounding the display area 60.

The display area 60 is provided with a pixel array, the pixel array having a transistor array substrate. The non-display area 70 is provided with the driving module 20, the source control chip 71 and the gate control chip 72. The driving module 20, the source control chip 71 and the gate control chip 72 are located on a same side of the display area 60.

The source control chip 72 is electrically connected to source electrodes of transistors in the transistor array substrate through data lines, the gate control chip 72 is electrically connected with gate electrodes of the transistors through scan lines.

The gate control chip 72 can be a gate control chip G1. The source control chip 71 can include a source control chip S1, a source control chip S2, a source control chip S3 and a source control chip S4. The gate control chip G1 can be connected to the gate (not shown) of thin film transistors in the display area 60 through scan lines. The source control chip S1, the source control chip S2, the source control chip S3 and the source control chip S4 are respectively fixed on the flexible circuit board 80 by a COF (Chip On Film) package, and is connected to a printed circuit board assembly (PCBA) 90 by the flexible circuit board 80. The source control chip S1, the source control chip S2, the source control chip S3 and the source control chip S4 are also connected to the sources of the thin film transistors in the display area 60 through the data lines, so that the source control chip S1, the source control chip S2, the source control chip S3, the source control chip S4 and the gate control chip G1 control the thin film transistor array to realize picture display on the display area 60.

The number of the source control chip and the gate control chip in this embodiment is merely an example. In other embodiments, the number of the source control chip and the gate control chip can also be determined according to the size of the liquid crystal display screen and the structure of the control chip.

In the above liquid crystal display, each liquid crystal pixel is provided with a same polarity pixel voltage of different levels in the two adjacent frames, and in each frame of the two adjacent frames, the level of the pixel voltage of each liquid crystal pixel is different from the level of the pixel voltage of the adjacent liquid crystal pixels in front, back, left or right. So that at the same time of displaying the same picture in two adjacent frames, the liquid crystal panel 10 can also achieve the effect of compensating for low color shift of viewing angle, and that is, the color shift phenomenon does not occur when the liquid crystal panel 10 is viewed from the large viewing angle.

In order to overcome the flicker uncomfortable phenomenon caused by the uneven brightness of the liquid crystal pixels of the liquid crystal panel 10 in two adjacent frames, the backlight module 30 can further be divided the brightness regions. The brightness of each brightness region can be and dynamically adjusted, so that the display brightness of each liquid crystal pixel of the liquid crystal panel 10 is uniform, and the flickering phenomenon can be eliminated or reduced. Referring to FIG. 4, FIG. 4 is a schematic structural view of a liquid crystal display according to another embodiment of the present application. Only the differences between the embodiment shown in FIG. 4 and the embodiment shown in FIG. 1 will be described below.

Referring to FIG. 4, the liquid crystal panel 10 is divided into M×N rectangular panel partitions $10_{11}, 10_{12}, \ldots, 10_{MN}$, the backlight module 30 is divided into M×N rectangular backlight partitions $30_{11}, 30_{12}, \ldots, 30_{MN}$, the rectangular panel partition $10_{ij}$ corresponds to the rectangular backlight partition $30_{ij}$, $1 \leq i \leq M$, $1 \leq j \leq N$ and Both i and j are integers. It should be noted that although the number of liquid crystal pixels included in the rectangular panel partition $10_{ij}$ is the same in the embodiment, it may be different as another embodiment.

The sum of the pixel voltages of all the liquid crystal pixels in the rectangular panel section $10_{ij}$ and the luminance of the rectangular backlight partition $30ij$ satisfy the following formula 1:

$$Lij\_1 * Vij\_1 = Lij\_2 * Vij\_2 \qquad \text{[formula 1]}$$

Wherein Lij_1 represents the luminance of the rectangular backlight partition $30_{ij}$ in the previous frame of two adjacent frames, Vij_1 represents the sum of the pixel voltages of all the liquid crystal pixels in the rectangular panel partition $10_{ij}$ in the previous frame of the two adjacent frames, Lij_2 represents the luminance of the rectangular backlight partition $30_{ij}$ in the latter frame of two adjacent frames, Vij_2 represents the sum of the pixel voltages of all the liquid crystal pixels in the rectangular panel partition $100_{ij}$ in the latter frame of the two adjacent frames.

Since the pixel voltage of the liquid crystal pixel is proportional to the light transmittance of the liquid crystal pixel, the product of the light transmittance of the liquid crystal pixel and the luminance of the backlight is the display luminance of the liquid crystal pixel, that is, the product of the pixel voltage of the liquid crystal pixel and the luminance of the backlight can express the display brightness of the liquid crystal pixel. When the product of the luminance of the rectangular backlight partition $30_{ij}$ and the sum of the pixel voltages of all the liquid crystal pixels in the rectangular panel partition $10_{ij}$ is equal, the display brightness of the rectangular panel partition $10_{ij}$ in the two adjacent frames is the same, and thus the flickering phenomenon can be eliminated.

After the liquid crystal panel 10 and the backlight module 30 are divided into regions, providing display light to the liquid crystal panel 10 by the backlight module 30 may include the following two manners. Of course, the two manners described below are merely examples, and the present application may also include other suitable ways.

The first manner of the backlight module 30 providing the liquid crystal panel 10 with light is as follows. In each frame of two adjacent frames, after the liquid crystal molecules of all the liquid crystal pixels in all rectangular panel partitions $10_{11}, 10_{12}, \ldots, 10_{MN}$ are deflected, the driving module 20 drive all the rectangular backlight partitions $30_{11}, 30_{12}, \ldots, 30_{MN}$ to emit light simultaneously. It should be understood that the luminance of each rectangular backlight partition may be different or the same, and the luminance of each rectangular backlight partition can be respectively controlled by the driving module 20.

The second manner of the backlight module 30 providing the liquid crystal panel 10 with light is as follows. In each frame of two adjacent frames, after the liquid crystal molecules of the liquid crystal pixel in the rectangular panel partition $10_{ij}$ are deflected, the driving module 20 drives the rectangle backlight partition $30_{ij}$ to emit light, till all the rectangular backlight partition $30_{11}, 30_{12}, \ldots, 30_{MN}$ are driven to emit light. That is, the driving module 20 drives each of the rectangular backlight partitions in a time sharing manner. It should be understood that the luminance of each rectangular backlight partition may be different or the same, and the luminance of each rectangular backlight partition can be respectively controlled by the driving module 20.

In order to make the brightness of the picture displayed by the liquid crystal panel 10 the same as the brightness of the picture displayed by the liquid crystal panel without the compensation effect of low color shift of viewing angle, the sum of the brightness of a same picture displayed in two adjacent frames of each rectangular panel partition of the liquid crystal panel can be twice the brightness of the picture displayed in one frame of the liquid crystal panel without compensating for low color shift of viewing angle. Specific technical solutions are as follows.

The sum of the pixel voltages of all the liquid crystal pixels in the rectangular panel partition $10_{ij}$ and the luminance of the rectangular backlight partition $30_{ij}$ satisfy the following formula 2

$$Lij\_1*Vij\_1+Lij\_2*Vij\_2=2*Lij*Vij \qquad \text{[formula 2]}$$

Wherein, Lij represents the luminance of the corresponding rectangular backlight partition when the liquid crystal display without compensating for low color shift of viewing angle is set to display the picture in only one frame. Vij represents the sum of the pixel voltages of all the liquid crystal pixels in the corresponding rectangular panel partition when the liquid crystal display without compensating for low color shift of viewing angle is set to display the picture in only one frame. It should be noted that, the liquid crystal display without compensating for low color shift of viewing angle displays different pictures in different frames.

The method of driving the liquid crystal display will be described below. FIG. 5 is a flowchart of a method of driving the liquid crystal display device of FIG. 1.

Referring to FIG. 1 and FIG. 5, the driving method of the liquid crystal display device according to the embodiment of the present application includes the following steps.

S310, in the previous frame of the two adjacent frames, the driving module 20 provides each liquid crystal pixel of the liquid crystal panel 10 with the pixel voltage so as to deflect liquid crystal molecules of each liquid crystal pixel.

S320, in the latter frame of the two adjacent frames, the driving module 20 provides each liquid crystal pixel of the liquid crystal panel 10 with the pixel voltage so as to deflect liquid crystal molecules of each liquid crystal pixel.

Wherein, in the previous frame and the latter frame, the pixel voltage of each liquid crystal pixel is different from the level of the pixel voltage of the adjacent liquid crystal pixels in front, back, left or right, and the pixel voltages of the same liquid crystal pixel have the same polarity and different levels.

Figure 6:
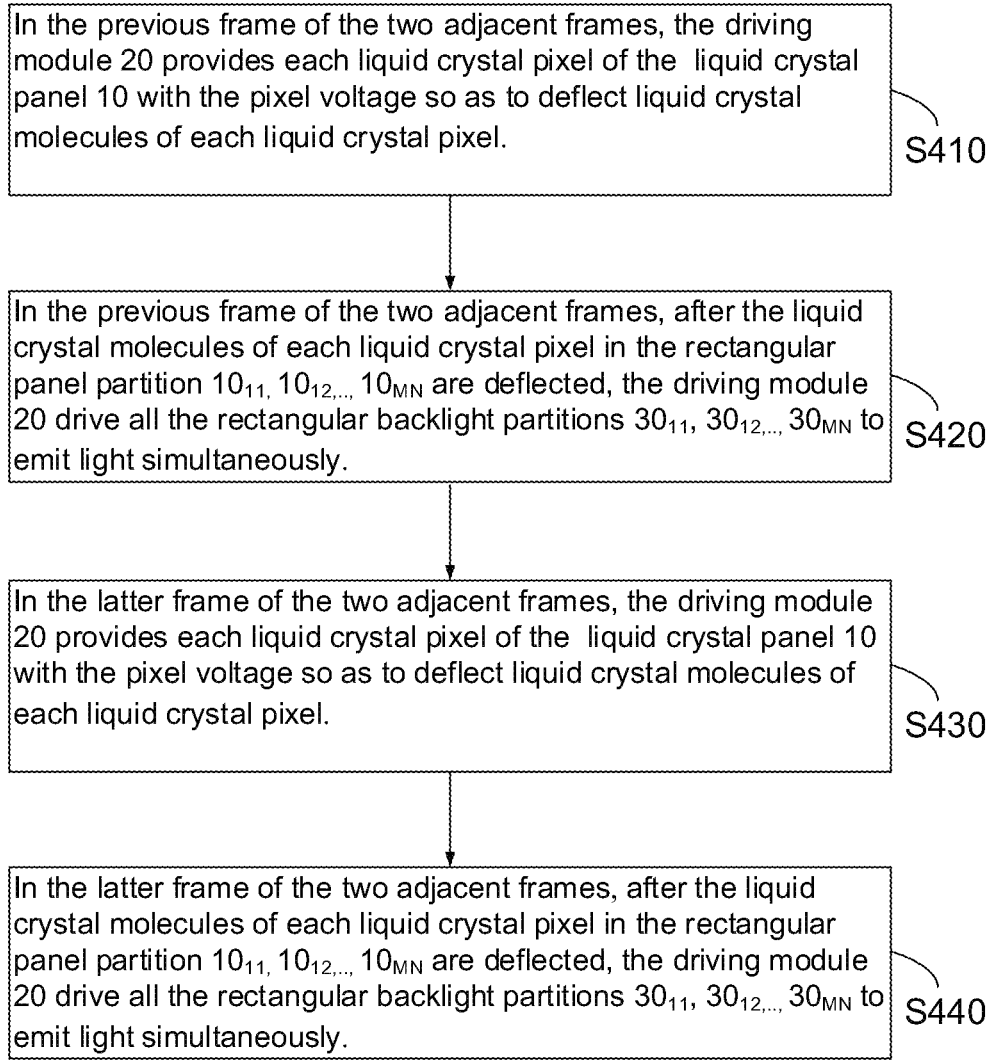
FIG. 6 is a flowchart of a method of driving the liquid crystal display device of FIG. 4.

FIG. 6 is a flowchart of a method of driving the liquid crystal display device of FIG. 4.

Referring to FIG. 4 and FIG. 6, the driving method of the liquid crystal display device according to the embodiment of the present application includes the following steps.

S410, in the previous frame of the two adjacent frames, the driving module 20 provides each liquid crystal pixel of the liquid crystal panel 10 with the pixel voltage so as to deflect liquid crystal molecules of each liquid crystal pixel.

S420, in the previous frame of the two adjacent frames, after the liquid crystal molecules of each liquid crystal pixel in the rectangular panel partition $10_{11}, 10_{12}, \ldots, 10_{MN}$ are deflected, the driving module 20 drive all the rectangular backlight partitions $30_{11}, 30_{12}, \ldots, 30_{MN}$ to emit light simultaneously.

S430, in the latter frame of the two adjacent frames, the driving module 20 provides each liquid crystal pixel of the liquid crystal panel 10 with the pixel voltage so as to deflect liquid crystal molecules of each liquid crystal pixel.

S440, in the latter frame of the two adjacent frames, after the liquid crystal molecules of each liquid crystal pixel in the rectangular panel partition $10_{11}, 10_{12}, \ldots, 10_{MN}$ are deflected, the driving module 20 drive all the rectangular backlight partitions $30_{11}, 30_{12}, \ldots, 30_{MN}$ to emit light simultaneously.

Wherein, in the previous frame and the latter frame, the pixel voltage of each liquid crystal pixel is different from the level of the pixel voltage of the adjacent liquid crystal pixels in front, back, left or right, and the pixel voltages of the same liquid crystal pixel have the same polarity and different levels.

Figure 7:
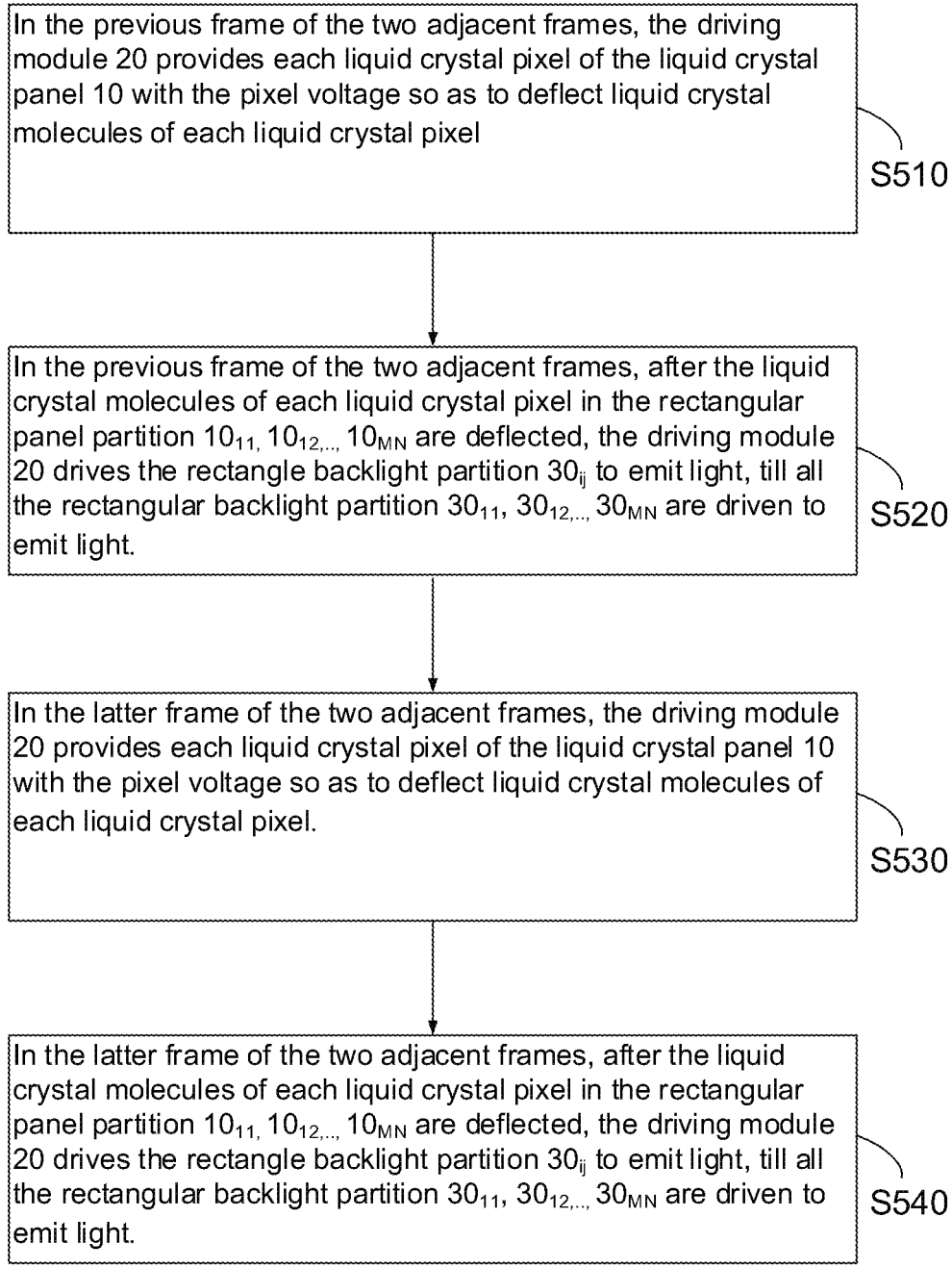
FIG. 7 is another flowchart of a method of driving the liquid crystal display device of FIG. 4.

FIG. 7 is another flowchart of a method of driving the liquid crystal display device of FIG. 4.

Referring to FIG. 4 and FIG. 7, the driving method of the liquid crystal display device according to the embodiment of the present application includes the following steps.

S510, in the previous frame of the two adjacent frames, the driving module 20 provides each liquid crystal pixel of the liquid crystal panel 10 with the pixel voltage so as to deflect liquid crystal molecules of each liquid crystal pixel.

S520, in the previous frame of the two adjacent frames, after the liquid crystal molecules of each liquid crystal pixel in the rectangular panel partition $10_{11}, 10_{12}, \ldots, 10_{MN}$ are deflected, the driving module 20 drives the rectangle backlight partition $30_{ij}$ to emit light, till all the rectangular backlight partition $30_{11}, 30_{12}, \ldots, 30_{MN}$ are driven to emit light.

S530, in the latter frame of the two adjacent frames, the driving module 20 provides each liquid crystal pixel of the liquid crystal panel 10 with the pixel voltage so as to deflect liquid crystal molecules of each liquid crystal pixel.

S540, in the latter frame of the two adjacent frames, after the liquid crystal molecules of each liquid crystal pixel in the rectangular panel partition $10_{11}$, $10_{12}$, . . . , $10_{MN}$ are deflected, the driving module 20 drives the rectangle backlight partition $30_{ij}$ to emit light, till all the rectangular backlight partition $30_{11}$, $30_{12}$, . . . , $30_{MN}$ are driven to emit light.

Wherein, in the previous frame and the latter frame, the pixel voltage of each liquid crystal pixel is different from the level of the pixel voltage of the adjacent liquid crystal pixels in front, back, left or right, and the pixel voltages of the same liquid crystal pixel have the same polarity and different levels.

Further, in the driving method shown in FIGS. 6 and 7, the sum of the pixel voltages of all the liquid crystal pixels in the rectangular panel partition $10ij$ and the luminance of the rectangle backlight partition $30_{ij}$ satisfy the above [formula 1] and/or [formula 2].

In summary, each liquid crystal pixel is provided with a same polarity pixel voltage of different levels in the two adjacent frames, and in each frame of the two adjacent frames, the level of the pixel voltage of each liquid crystal pixel is different from the level of the pixel voltage of the adjacent liquid crystal pixels in front, back, left or right. So that at the same time of displaying the same picture in two adjacent frames, the liquid crystal panel 10 can also achieve the effect of compensating for low color shift of viewing angle, and that is, the color shift phenomenon does not occur when the liquid crystal panel 10 is viewed from the large viewing angle. The liquid crystal pixel can not be used as a main/sub sub-pixel, it is not necessary to add the metal wiring and the thin film transistor to drive the main/sub sub-pixel. So that the aperture ratio would not be reduced. The product of the luminance of the rectangular backlight partition and the sum of the pixel voltages of all the liquid crystal pixels in the rectangular panel partition is equal, so that the display brightness of the rectangular panel partition in the previous frame and the latter frame of the two adjacent frames is the same, and thus the flickering phenomenon can be eliminated. The sum of the brightness of a same picture displayed in two adjacent frames of each rectangular panel partition of the liquid crystal panel can be twice the brightness of the picture displayed in one frame of the liquid crystal panel without compensating for low color shift of viewing angle, so that the brightness of the picture displayed by the liquid crystal panel can be the same as the brightness of the picture displayed by the liquid crystal panel without the compensation effect of low color shift of viewing angle.

Finally, it should be noted that the above embodiments are merely illustrative of the technical solutions of the present disclosure and are not intended to be limiting thereof. For the person skilled in the art of the disclosure, without departing from the concept of the disclosure, simple deductions or substitutions can be made and should be included in the protection scope of the disclosure.

What is claimed is:

1. A liquid crystal display device, comprising:
    a liquid crystal panel, comprising a plurality of liquid crystal pixels, wherein the liquid crystal panel is configured to display a same picture in two adjacent frames, the liquid crystal panel further comprises a display area and a non-display area surrounding the display area, and the display area is provided with a transistor array substrate;
    a driving module disposed on the non-display area, wherein the driving module is used to respectively provide each liquid crystal pixel with a same polarity pixel voltage of different levels in the two adjacent frames so as to deflect liquid crystal molecules of each liquid crystal pixel, and in each frame of the two adjacent frames, the level of the pixel voltage of each liquid crystal pixel is different from the level of the pixel voltage of the adjacent liquid crystal pixels in front, back, left or right;
    wherein the non-display area is provided with a source control chip and a gate control chip, the source control chip is electrically connected to source electrodes of the transistors in the transistor array substrate through data lines, the gate control chip is electrically connected with gate electrodes of the transistors through scan lines, and the source control chip and the gate control chip are located at a same side of the display area.

2. The liquid crystal display device according to claim 1, wherein the liquid crystal display device further comprises a backlight module, the liquid crystal panel is divided into M×N rectangular panel partitions, the backlight module is divided into M×N rectangular backlight partitions, $1 \leq i \leq M$, $1 \leq j \leq N$, the rectangular panel partition of row i and column j corresponds to the rectangular backlight partition of row i and column j;
    in each frame of two adjacent frames, after the liquid crystal molecules of each liquid crystal pixel in each rectangular panel partition are deflected, the driving module is further configured to drive all the rectangular backlight partitions to emit light simultaneously.

3. The liquid crystal display device according to claim 1, wherein the liquid crystal display device further comprises backlight module, the liquid crystal panel is divided into M×N rectangular panel partitions, the backlight module is divided into M×N rectangular backlight partitions, $1 \leq i \leq M$, $1 \leq j \leq N$, the rectangular panel partition of the i-th row and the j-th column corresponds to the rectangular backlight partition of the i-th row and the j-th column;
    in each frame of two adjacent frames, after the liquid crystal molecules of each liquid crystal pixel in the rectangular panel partition of the i-th row and the j-th column are deflected, the driving module is further configured to drive the rectangle backlight partition of the i-th row and the j-th column to emit light, till all the rectangular backlight partition are driven to emit light.

4. The liquid crystal display device according to claim 2, wherein sum of the pixel voltages of all the liquid crystal pixels in the rectangular panel partition of the i-th row and the j-th column and luminance of the rectangular backlight partition in the jth column of the i-th row satisfy the following formula 1, $$Lij\_1 * Vij\_1 = Lij\_2 * Vij\_2, \qquad \text{[formula 1]}$$

wherein Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames.

5. The liquid crystal display device according to claim 3, wherein the sum of the pixel voltages of all the liquid crystal pixels in the rectangular panel partition of the i-th row and the j-th column and luminance of the rectangular backlight partition in the jth column of the i-th row satisfy the following formula 1, $$Lij\_1 * Vij\_1 = Lij\_2 * Vij\_2, \qquad \text{[formula 1]}$$

wherein Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames.

6. The liquid crystal display device according to claim 2, wherein the sum of the pixel voltages of all the liquid crystal pixels in the rectangular panel partition of the i-th row and the j-th column and luminance of the rectangular backlight partition in the jth column of the i-th row satisfy the following formula 2, $$Lij\_1 * Vij\_1 + Lij\_2 * Vij\_2 = 2 * Lij * Vij, \qquad \text{[formula 2]}$$

wherein Lij represents the luminance of the rectangular backlight partition of the ith row and the jth column when the liquid crystal display is set to display the picture in only one frame, Vij represents the sum of the pixel voltages of all the liquid crystal pixels in the rectangular panel partition when the liquid crystal display is set to display the picture in only one frame, Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames.

7. The liquid crystal display device according to claim 3, wherein the sum of the pixel voltages of all the liquid crystal pixels in the rectangular panel partition of the i-th row and the j-th column and luminance of the rectangular backlight partition in the jth column of the i-th row satisfy the following formula 2, $$Lij\_1 * Vij\_1 + Lij\_2 * Vij\_2 = 2 * Lij * Vij, \qquad \text{[formula 2]}$$

wherein Lij represents the luminance of the rectangular backlight partition of the ith row and the jth column when the liquid crystal display is set to display the picture in only one frame, Vij represents the sum of the pixel voltages of all the liquid crystal pixels in the rectangular panel partition when the liquid crystal display is set to display the picture in only one frame, Lij_1 represents the luminance of the rectangular backlight partition in the i-th row and j-th column in the previous frame of two adjacent frames, Vij_1 represents the sum of the pixel voltages of all the liquid crystal pixels in the rectangular panel partition of the i-th row and j-th column in the previous frame of the two adjacent frames, Lij_2 represents the luminance of the rectangular backlight partition of the i-th row and j-th column in the latter frame of two adjacent frames, Vij_2 represents the sum of the pixel voltages of all the liquid crystal pixels in the rectangular panel partition of the i-th row and j-th column in the latter frame of the two adjacent frames.

8. The liquid crystal display device according to claim 4, wherein the sum of the pixel voltages of all the liquid crystal pixels in the rectangular panel partition of the i-th row and the j-th column and luminance of the rectangular backlight partition in the jth column of the i-th row satisfy the following formula 2, $$Lij\_1 * Vij\_1 + Lij\_2 * Vij\_2 = 2 * Lij * Vij, \qquad \text{[formula 2]}$$

wherein Lij represents the luminance of the rectangular backlight partition of the ith row and the jth column when the liquid crystal display is set to display the picture in only one frame, Vij represents the sum of the pixel voltages of all the liquid crystal pixels in the rectangular panel partition when the liquid crystal display is set to display the picture in only one frame.

9. The liquid crystal display device according to claim 1, wherein a number of lateral transistors in each row on the transistor array substrate is greater than that of vertical transistors in each column, and the source control chip and the gate control chip are located at a lateral side of the display area.

10. The liquid crystal display device according to claim 1, wherein thin film transistors in the transistor array substrate are single gate transistors, the gate control chip and the source control chip are sequentially arranged along a lateral side of the display area.

11. The liquid crystal display device according to claim 1, wherein the source control chip and the gate control chip are both fixed on a flexible circuit board by chip on film package.

12. The liquid crystal display device according to claim 1, wherein the source control chip and the gate control chip are both fixed on a flexible circuit board by tape carrier package.

13. The liquid crystal display device according to claim 1, wherein the liquid crystal panel is a liquid crystal panel with a vertically aligned display mode.

14. The liquid crystal display device according to claim 13, wherein the liquid crystal panel comprises the transistor array substrate, a color filter substrate and negative liquid crystal, the negative liquid crystal is sandwiched between the color filter substrate and the array substrate.

15. The liquid crystal display device according to claim 13, wherein the liquid crystal panel and the backlight module are arranged facing each other, and the liquid crystal panel and the backlight module are combined and fixed by a frame.

16. The liquid crystal display device according to claim 1, wherein the liquid crystal pixel comprises at least one red liquid crystal pixel, at least one green liquid crystal pixel or at least one blue liquid crystal pixel, in the column direction, the liquid crystal pixels are the same color liquid crystal pixels, and in the row direction, the liquid crystal pixels are arranged sequentially with groups of the red liquid crystal pixel, the green liquid crystal pixel and the blue liquid crystal pixel.

17. A liquid crystal display device, comprising:
a liquid crystal panel, comprising a plurality of liquid crystal pixels, wherein the liquid crystal panel is configured to display a same picture in two adjacent frames, the liquid crystal panel further comprises a display area and a non-display area surrounding the display area, the display area is provided with a transistor array substrate, the liquid crystal panel is a liquid crystal panel with a vertically aligned display mode, and the liquid crystal pixel comprises at least one red liquid crystal pixel, at least one green liquid crystal pixel or at least one blue liquid crystal pixel;
a driving module disposed on the non-display area, wherein the driving module is used to respectively provide each liquid crystal pixel with a same polarity pixel voltage of different levels in the two adjacent frames so as to deflect liquid crystal molecules of each liquid crystal pixel, and in each frame of the two adjacent frames, the level of the pixel voltage of each liquid crystal pixel is different from the level of the pixel voltage of the adjacent liquid crystal pixels in front, back, left or right;
wherein the non-display area is provided with a source control chip and a gate control chip, the source control chip is electrically connected to source electrodes of the transistors in the transistor array substrate through data lines, the gate control chip is electrically connected with gate electrodes of the transistors through scan lines, and the source control chip and the gate control chip are located at a same side of the display area.

18. The liquid crystal display device according to claim 17, wherein the pixel voltage of the liquid crystal pixel is proportional to the light transmittance of the liquid crystal pixel, a product of the light transmittance of the liquid crystal pixel and luminance of backlight is display brightness of the liquid crystal pixel.

19. The liquid crystal display device according to claim 17, wherein sum of the brightness of a same picture displayed in two adjacent frames of each rectangular panel partition of the liquid crystal panel is twice the brightness of the picture displayed in one frame of the liquid crystal panel without compensating for low color shift of viewing angle.

20. The liquid crystal display device according to claim 17, wherein the liquid crystal panel comprises the transistor array substrate, a color filter substrate and negative liquid crystal, the negative liquid crystal is sandwiched between the color filter substrate and the array substrate.

* * * * *